United States Patent
O'Connell

(10) Patent No.: US 9,120,566 B2
(45) Date of Patent: Sep. 1, 2015

(54) QUICK RELEASE ASSEMBLY FOR AIRCRAFT LANDING GEAR

(75) Inventor: Charles T. O'Connell, Summerfield, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 604 days.

(21) Appl. No.: 13/384,480

(22) PCT Filed: Oct. 14, 2011

(86) PCT No.: PCT/US2011/056483
§ 371 (c)(1),
(2), (4) Date: Jan. 17, 2012

(87) PCT Pub. No.: WO2012/054360
PCT Pub. Date: Apr. 26, 2012

(65) Prior Publication Data
US 2012/0132742 A1    May 31, 2012

Related U.S. Application Data

(60) Provisional application No. 61/394,250, filed on Oct. 18, 2010.

(51) Int. Cl.
*B64C 25/50*     (2006.01)
*F16C 11/02*    (2006.01)
*B64C 25/14*    (2006.01)
(Continued)

(52) U.S. Cl.
CPC ............... *B64C 25/50* (2013.01); *F16C 11/02* (2013.01); *B64C 25/14* (2013.01); *B64C 2025/006* (2013.01); *F16C 11/045* (2013.01); *F16C 2326/43* (2013.01); *Y10T 403/602* (2015.01)

(58) Field of Classification Search
CPC ........ B64C 25/50; B64C 25/14; B64C 25/26; F16C 11/02
USPC .... 244/100 R, 102 A, 102 SL, 102 SS, 104 R
See application file for complete search history.

(56) References Cited

U.S. PATENT DOCUMENTS 2,487,329 A * 11/1949 Gerry ............................... 403/58
2,499,619 A *  3/1950 Wood .............................. 403/54
(Continued)

OTHER PUBLICATIONS

International Search Report and Written Opinion of PCT/US2011/056483 dated Jan. 30, 2012.
(Continued)

*Primary Examiner* — Tien Dinh
*Assistant Examiner* — Steven Hawk
(74) *Attorney, Agent, or Firm* — Rankin, Hill & Clark LLP

(57) ABSTRACT

A torque link member for aircraft landing gear includes a first end for connecting to a lower portion or an upper portion of the aircraft landing gear and a second end for connecting to another torque link member. A locking pin is disposed on one of the upper portion, the lower portion, the first end or the second end. The locking pin is axially movable between an engaged position wherein the pin protrudes for interengagement with a cooperating aperture on the first end, the second end, the upper portion, the lower portion, or the second end of the other torque link member, and a disengaged position. The locking pin is biased toward the engaged position and movable against the biasing to the disengaged position.

18 Claims, 9 Drawing Sheets

(51) Int. Cl.
  *F16C 11/04* (2006.01)
  *B64C 25/00* (2006.01)

(56) References Cited

U.S. PATENT DOCUMENTS

| | | | | |
|---|---|---|---|---|
| 3,348,869 A | * | 10/1967 | Zern | 294/3.6 |
| 3,430,896 A | | 3/1969 | Labrecque | |
| 3,538,538 A | | 11/1970 | Field | |
| 4,028,773 A | * | 6/1977 | Morgan | 16/35 R |
| 4,132,376 A | * | 1/1979 | Sharples | 244/104 R |
| 4,155,523 A | | 5/1979 | Morford et al. | |
| 4,339,845 A | | 7/1982 | Newlon et al. | |
| 4,414,702 A | * | 11/1983 | Neumann | 16/35 R |
| 4,583,262 A | | 4/1986 | Werner | |
| 5,333,816 A | * | 8/1994 | Del Monte | 244/50 |
| 5,860,622 A | | 1/1999 | Weibert | |
| 5,983,614 A | * | 11/1999 | Hancock et al. | 56/16.7 |
| 6,061,874 A | | 5/2000 | Tatara | |
| 6,604,707 B2 | * | 8/2003 | McVaugh | 244/50 |
| 6,942,180 B2 | * | 9/2005 | McVaugh | 244/50 |
| 7,051,977 B2 | * | 5/2006 | Yoshioka | 244/103 R |
| 7,316,373 B2 | | 1/2008 | Nagayama et al. | |
| 2004/0195442 A1 | * | 10/2004 | Yoshioka | 244/104 CS |
| 2009/0101754 A1 | * | 4/2009 | O'Connell | 244/102 SL |
| 2012/0187239 A1 | * | 7/2012 | Martin | 244/50 |

OTHER PUBLICATIONS

Communication pursuant to Rule 164(1) EPC of EP App. No. 11 834 911.7 dated Nov. 26, 2014, 6 pages.

* cited by examiner

QUICK RELEASE ASSEMBLY FOR AIRCRAFT LANDING GEAR

This application claims the benefit of U.S. provisional patent application Ser. No. 61/394,250, filed Oct. 18, 2010, which is incorporated by reference in its entirety herein.

BACKGROUND

The present disclosure generally relates to a quick release assembly, and more particularly relates to a quick release assembly for an aircraft landing gear strut, though the quick release assembly is amenable to other applications.

The forward landing gear for an aircraft is typically comprised of an aircraft landing gear strut of the type having an upper cylinder portion and a lower piston portion telescopingly or reciprocally received in the cylinder portion. The upper cylinder portion is connected to an underside of a forward portion of the aircraft. A wheel frame rotatably mounting a landing wheel is secured to the piston portion. Relative movement between the lower piston portion and the upper cylinder portion, and thus between the wheel and the aircraft, can be hydraulically or pneumatically controlled to provide cushioning characteristics allowing the strut to absorb ground shocks when the aircraft is landing.

In landing gear of this type, the landing wheel can be steered by a pilot in the aircraft as is necessary for steering the aircraft after landing. In one example, a steering apparatus includes steering collar disposed on the cylinder portion. The steering collar is rotated by a steering actuator in accordance with steering input provided by the pilot. A pair of torque link members connects the steering collar to the landing wheel, and particularly the wheel frame, to transmit steering from the collar to the wheel. The torque link members prevent relative rotation between the steering collar and the wheel, while allowing reciprocal movement between the upper cylinder portion and the wheel.

After landing, it is often desirable to disconnect the landing wheel from the steering collar and thus from the steering apparatus to allow free rotation of the landing wheel. This can allow the aircraft to be maneuvered from the ground, such as when being towed by a tractor or other land vehicle. To disconnect the steering wheel frame from the steering collar, the torque link members are usually disconnected, either from one another or together from the cylinder portion or the piston portion. A disconnection assembly can be provided in association with the torque link members to facilitate such disconnection of the torque link members; however, known disconnection means or assemblies can be heavy, overly complex, prone to having parts lost, generally unwieldy or cumbersome, and/or likely to become obstructions when in a disconnected state (e.g., a dangling lanyard).

SUMMARY

According to one aspect, a quick release assembly includes a pinching structure having at least two pronged portions, a pinched structure and a locking pin disposed on each of the at least two pronged portions. The locking pin includes a handle portion, a stationary cap fixed to the pronged portion, a slider tube that slides inside the stationary cap and together with the handle portion between an engaged position and a disengaged position, and a spring biasing the slider tube toward the engaged position. A bore size of the stationary cap of the pinching structure and a bushing of the pinched structure are substantially the same size, and a section area of a connecting side of the slider tube is slightly smaller than the bore size of the stationary cap of the pinching structure and the bushing of the pinched structure.

According to another aspect, a quick release assembly for an aircraft landing gear strut is provided. The strut has an upper portion and a lower portion that is telescopingly and rotatably movable relative to the upper portion. An upper torque link member has a first end connected to the upper portion. A lower torque link member has a first end connected to the lower portion. Second ends of the torque link members are connected together to prevent relative rotation between the upper and lower portions. The quick release assembly comprises a locking pin disposed on a first member wherein the first member is one of the upper portion, the upper torque link member, the lower torque link member or the lower portion. A cooperating structure is disposed on a second member wherein the second member is another of the upper portion, the upper torque link member, the lower torque link member or the lower portion. The locking pin is axially urged toward an engaged position wherein the locking pin cooperates with the cooperating structure of the second member when the locking pin and the cooperating structure are aligned to connect the first and second members together. The locking pin is axially movable against the urging from the engaged position to a disengaged position to disconnect the first and second members.

According to still another aspect, an aircraft landing gear assembly includes an upper portion, a lower portion telescopingly and rotatably movable relative to the upper portion, an upper link having a first end connected to the upper portion and a second end, and a lower torque link having a first end connected to the upper portion and a second end. The second ends of the upper and lower torque links are connected together to prevent relative rotation between the upper and lower portions. The aircraft landing gear assembly further including a quick release assembly connecting one of the first end of the upper torque link and the upper portion, the first end of the lower torque link and the lower portion, or the second end of the upper torque link and the second end of the lower torque link. The quick release assembly including a pin disposed on one of the first end of the upper torque link, the upper portion, the first end of the lower torque link, the lower portion, the second end of the upper torque link or the second end of the lower torque link.

The pin is slidably movable between an engaged position and a disengaged position with the pin urged toward the engaged position wherein the pin cooperates a cooperating structure disposed on another of the first end of the upper torque link, the upper portion, the first end of the lower torque link, the lower portion, the second end of the upper torque link or the second end of the lower torque link when the pin is aligned with the cooperating structure thereon. The pin is manually movable against the urging to the disengaged position for disconnecting said one of the first end of the upper torque link, the upper portion, the first end of the lower torque link, the lower portion, the second end of the upper torque link or the second end of the lower torque link from said another of the first end of the upper torque link, the upper portion, the first end of the lower torque link, the lower portion, the second end of the upper torque link or the second end of the lower torque link.

According to a further aspect, a torque link member for aircraft landing gear includes a first end for connecting to a lower portion or an upper portion of the aircraft landing gear and a second end for connecting to another torque link member. A locking pin is disposed on one of the first end or the second end. The locking pin is axially movable between an engaged position wherein the pin protrudes for interengagement with a cooperating aperture on one of the upper portion, the lower portion or the second end of the other torque link member, and a disengaged position. The locking pin is biased toward the engaged position and movable against the biasing to the disengaged position.

DETAILED DESCRIPTION

Figure 1:
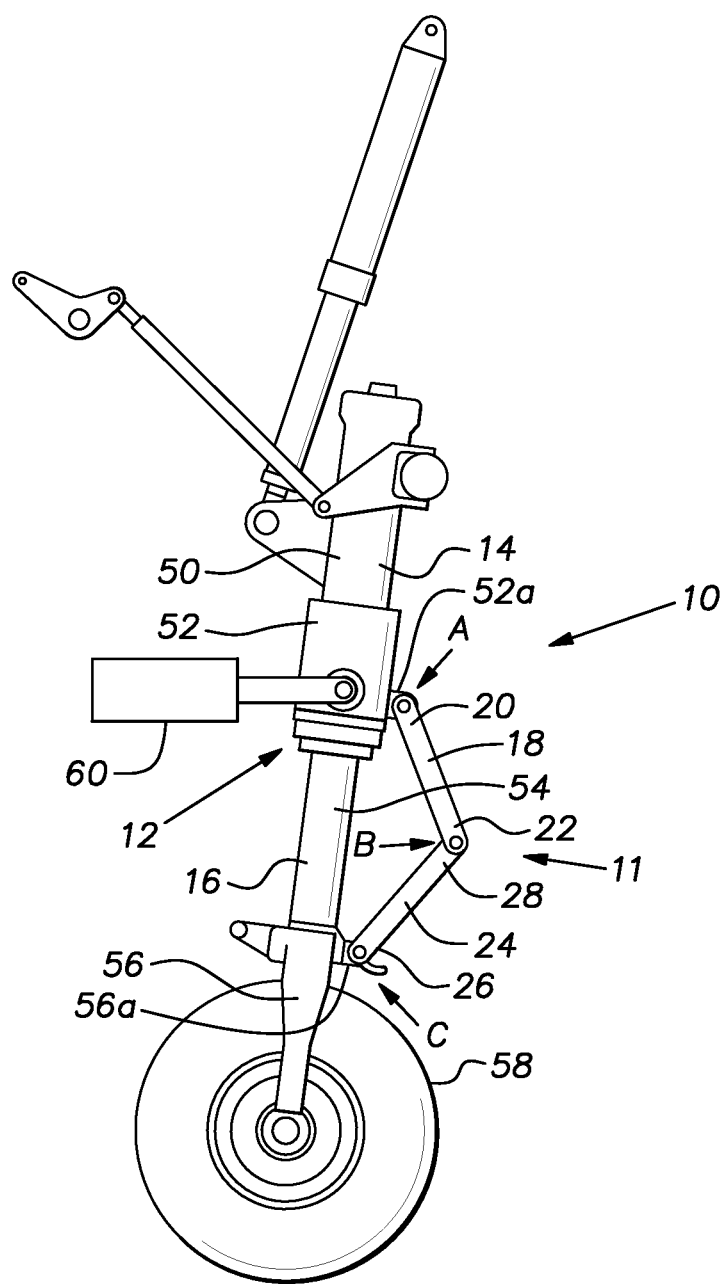
FIG. 1 is a schematic elevational view of aircraft landing gear having a lower portion connected to an upper portion by a pair of torque link members.

Referring now to the drawings wherein the showings are for purposes of illustrating one or more exemplary embodiments and not for purposes of limiting same, FIG. 1 illustrates aircraft landing gear or a gear assembly generally designated by reference numeral 10. The aircraft landing gear 10 is comprised of an aircraft landing gear strut 12 having an upper portion 14 and a lower portion 16 wherein the lower portion 16 is telescopingly and rotatably movable relative to the upper portion 14. The upper portion 14 is also connected to the lower portion 16 by a torque link 11 having a pair of torque link members 18, 24 and three connecting portions A, B, C.

More particularly, the upper torque link member 18 has a first end 20 and a second end 22. The first end 20 is connected to the upper portion 14 at upper connecting portion A. The lower torque link member 24 likewise has a first end 26 and a second end 28. The first end 26 is connected to the lower portion 16 at lower connecting portion C. The second ends 22, 28 of the torque link members 18, 22 are connected together at middle connecting portion B to prevent relative rotation between the upper and lower portions 14, 16. In the illustrated embodiment, lug 52a of a steering collar 52 of the upper portion 14 and the first end 20 of the upper torque link member 18 are connected together at the upper connecting portion A. The second end 22 of the upper torque link member 18 and the second end 28 of the lower torque link member 24 are connected together at the middle connecting portion B. The first end 26 of the lower torque link member 24 and lug 56a of the wheel frame 56 of the lower portion 16 are connected together at the lower connecting portion C.

Figure 2:
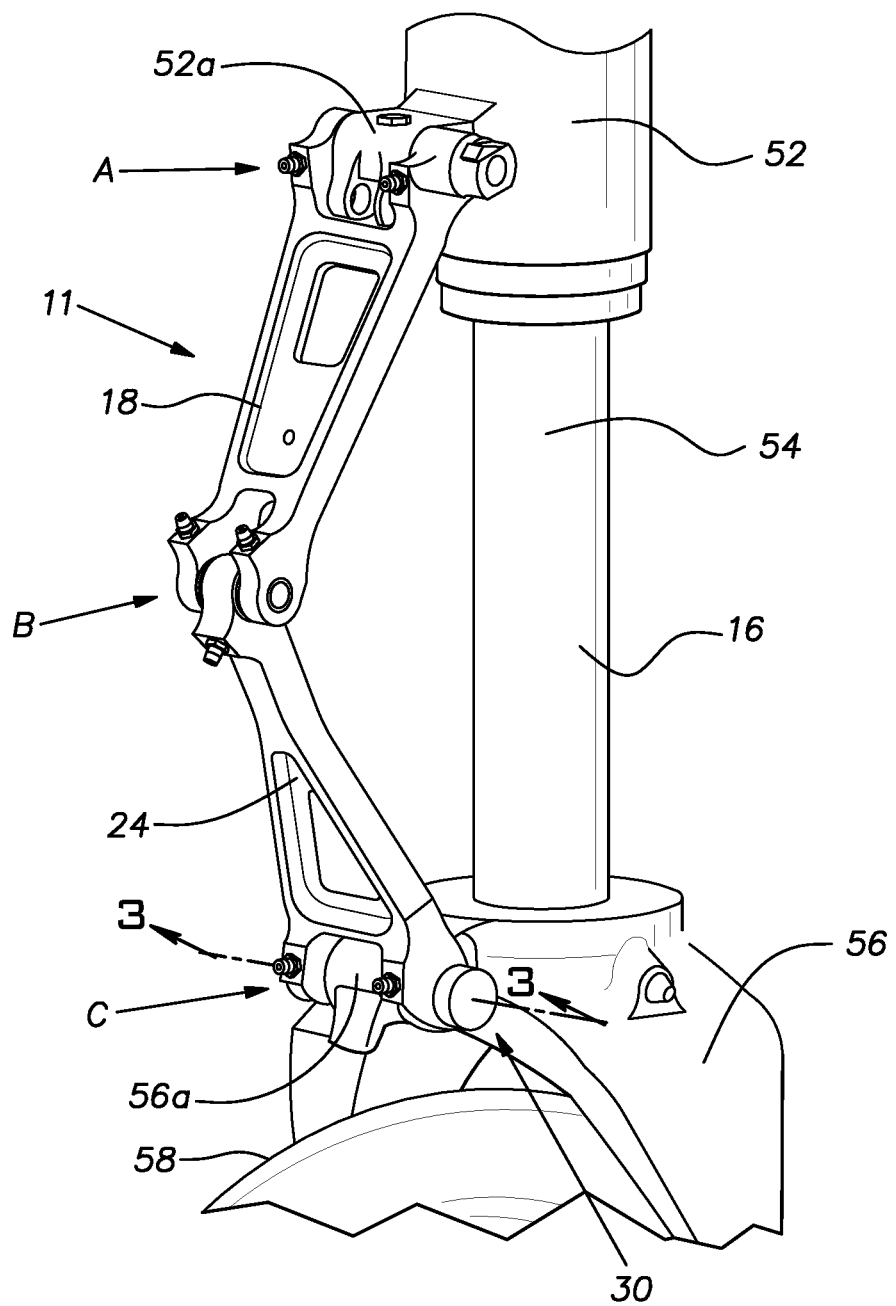
FIG. 2 is a partial perspective view of aircraft landing gear similar to FIG. 1, but including a quick release assembly disposed at a lower connecting portion and shown in a locking condition (i.e., connecting a lower one of the torque link members to the lower portion).

As will be described in more detail below, the aircraft landing gear assembly 10 can include a quick release assembly (e.g., quick release assembly 30 shown in FIG. 2) that can be used at any one or more of the three connecting portions A, B, C. In particular, the quick release assembly 30 can releasably connect one of the first end 20 of the upper torque link 18 and the upper portion 14, the first end 26 of the lower torque link 24 and the lower portion 16 and/or the second end 22 of the upper torque link 18 and the second end 28 of the lower torque link 24. In the illustrated embodiment, the quick release assembly is used at the lower connecting portion C as shown by FIG. 2, which can provide an advantage as compared with other configurations in that the arrangement can prevent damage to other structures by the torque link members 18, 24.

As will also be described in more detail below, the quick release assembly 30 can include a locking pin (e.g., locking pins 32, 34 of FIG. 3) disposed on a first member wherein the first member is one of the upper portion 14, the upper torque link 18, the lower torque link 24 or the lower portion 16, and a cooperating structure (e.g., cooperating structures 36, 38 of FIG. 3) disposed on a second member wherein the second member is another of the upper portion 14, the upper torque link member 18, the lower torque link member 24 or the lower portion 16. The locking pin can be axially urged toward an engaged position wherein the locking pin cooperates with the cooperating structure of the second member when the locking pin and the cooperating structure are aligned (or two locking pins 32, 34 cooperate with two aligned cooperating structures 36, 38) to connect the first and second members together. The locking pin can be axially movable against this urging from the engaged position to a disengaged position to disconnect the first and second members.

In the illustrated embodiment of FIGS. 2-5, the first member is the lower torque link member 24 and the second member is the lower portion 16. The lower torque link member 24 includes a pair of locking pins 32, 34 and the lower portion 16 includes a pair of corresponding cooperating structures 36, 38. Accordingly, the locking pins 32, 34 are disposed on the lower torque link member 24 and the cooperating structures 36, 38, which are configured for selectively receiving the locking pins 32, 34, are disposed on the lower portion 16. More specifically, in the embodiment illustrated in FIGS. 2-5, the locking pins 32, 34 are disposed on the first end 26 of the lower torque link member 24. Alternatively, though not illustrated, a locking pin or pins could be disposed on the lower portion 16, the second end 28 of the lower torque link member 24, the second end 22 of the upper torque link member 18, the first end 20 of the upper torque link member 18 or the upper portion 14.

The locking pins 32, 34 of the illustrated embodiment are slidably movable between respective engaged or extended positions and respective disengaged or retracted positions with the pins 32, 34 urged toward their engaged positions. In particular, the pins 32, 34 can be manually moved against the urging to the disengaged positions for disconnecting otherwise connected components. When in a locking condition (shown in FIGS. 2 and 3), the pins 32, 34 of the lower torque link member 24 are in their engaged positions and cooperatively engage the cooperating structures 36, 38 disposed on the lower portion 16 to connect the lower torque link member 24 and the lower portion 16. When in a disengaged condition (shown in FIG. 4), the pins 32, 34 are removed from the cooperating structures 36, 38 and the lower torque link member 24 is removed from the lower portion 16.

To get from the locked condition to the disengaged condition, the pins 32, 34 are forcibly moved or pulled against the urging (e.g., the urging of springs 66) from their engaged positions to their disengaged positions thereby allowing the lower torque link member 24 to be moved apart from the lower connecting portion C. Even in the disengaged condition, the pins 32, 34 return to their engaged positions absent a sufficient force applied to hold them back from their engaged positions due to the urging of the pins 32, 34 toward their engaged positions. To reconnect the lower torque link member 24 and the lower portion 16 (i.e., move from the disengaged condition to the locked condition), the pins 32, 34 are again retracted forcibly from their engaged positions to their disengaged positions, then aligned with the cooperating structures 36, 38 and released to allow the urging to cooperatively engage the pins 32, 34 with the cooperating structures 36, 38.

When the locking pin or pins are disposed elsewhere, such as on the first end 26 of the upper torque link member 18, the upper portion 14, the second end 22 of the upper torque link member 18, the second end 28 of the lower torque link member 24 or the lower portion 16, the cooperating structure or structures can be disposed on a corresponding one of on the upper portion 14, the first end 20 of the upper torque link member 18, the second end 28 of the lower torque link member 24, the second end 22 of the upper torque link member 18 or the first end of the lower torque link member 24. In these alternate configurations, the pin or pins can be manually movable for disconnecting one of the first end 20 of the upper torque link member 18, the upper portion 14, the second end 22 of the upper torque link member 18, the second end 28 of the lower torque link member 24 or the lower portion 16 from said another of the upper portion 14, the first end 20 of the upper torque link member 18, the second end 28 of the lower torque link member 24, the second end 22 of the upper torque link member 18 or the first end 26 of the lower torque link member 24.

As shown in FIG. 1, the upper portion 14 can include a cylinder 50 having a steering collar 52. The lower portion 16 can include a piston 54 reciprocally or telescopingly received within or relative to the cylinder 50 of the upper portion 14. A wheel frame or fork 56 can be fixably secured to the piston 54 for movement with the piston 54 and thus reciprocal relative to the upper portion 14. The wheel frame or fork 56 can rotatably support a wheel 58. As shown, the torque link 11, comprised of the torque links 18, 24, connects the steering collar 52 to the wheel frame 56 to transmit steering forces from the steering collar 52 to the fork 56 for steering of the wheel 58. In particular, when guided steering of the steering collar 52 is commanded by a steering actuator 60, such steering is transmitted through the links 18, 24 to the wheel frame 56 and wheel 58. The links 18, 24 transmit such steering forces while allowing relative reciprocal movement of the wheel frame 56 and wheel 58 via the piston 54 (i.e., relative to the upper portion 14).

Sometimes, however, it is desirable to disconnect the wheel frame 56 from the torque link 11 to allow free rotation of the wheel frame 56 and wheel 58 to freely rotate relative to the upper portion 14, and particularly the steering collar 52. For example, free steering of the wheel 58 might be desired after landing when the aircraft is being towed by a tractor or other land vehicle. This can be arranged by providing a removable connection (e.g., at one or more of connecting portions A, B or C) for the links 18, 24 and such removable connection can be facilitated via the quick release assembly 30 described herein.

Figure 5:
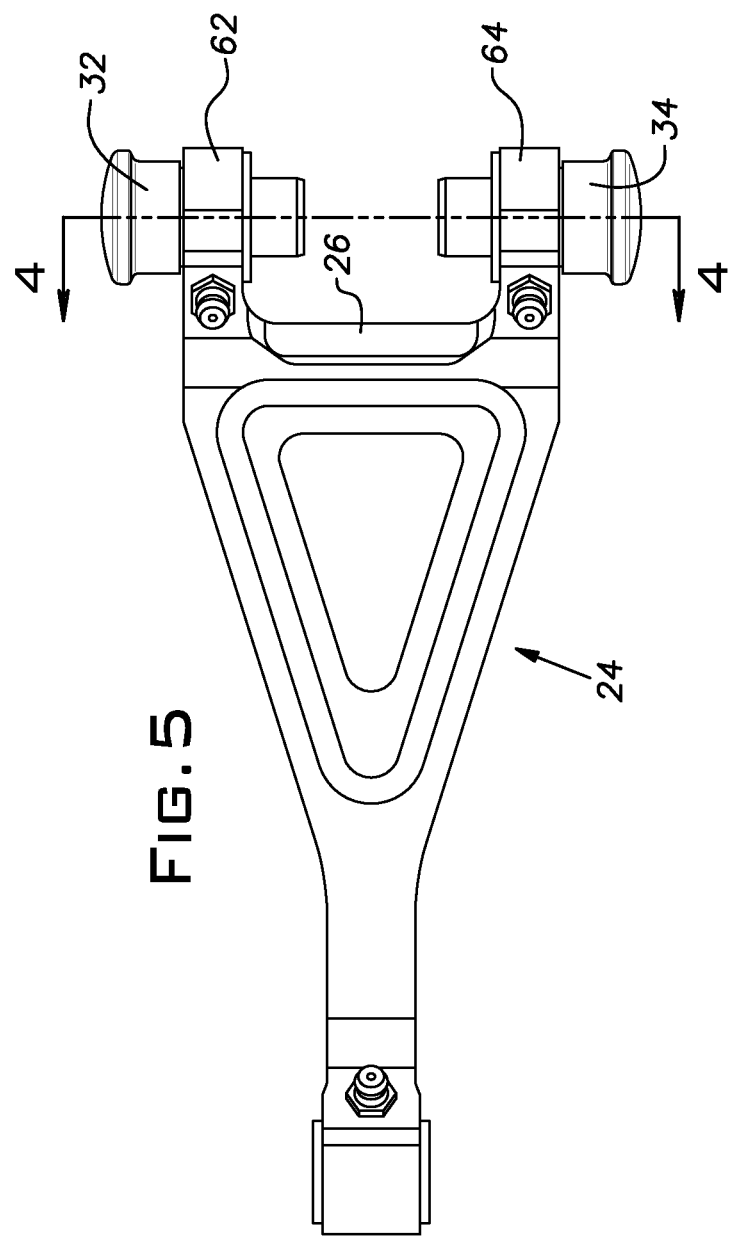
FIG. 5 is a plan view of the lower torque link member shown in isolation from the landing gear.

In the embodiment in FIGS. 2-5, the quick release assembly 30 is provided on the lower torque link 24 at the first end 26 thereof. As best shown in FIG. 5, the lower torque link 24 is configured as a two-pronged structure or fork at the first end 26 having first and second spaced apart fork arms 62, 64 and accordingly the end 26 can be referred to as a fork or pronged end. The quick release assembly 30 of this embodiment includes two pins, i.e., the locking pins 32, 34. The first locking pin 32 is disposed on the first arm 62 and the second locking pin 34 is disposed on the second arm 64. In this configuration, the pins 32, 34 protrude toward one another when in the respective engaged positions and are disengaged away from one another (i.e., pulled apart) when moved to the respective disengaged positions. Accordingly, the lower torque link 24, and particularly the forked end 26, is configured as a pinching structure.

The lower portion 16 includes the cooperating structures 36, 38 that are configured to cooperatively received the pins 32, 34. In particular, the lower portion 16 has a lug or lug portion 56a formed on the wheel frame 56. In the illustrated embodiment, the lug portion 56a is formed as a single-pronged structure that is sandwiched or pinched between the two-pronged fork end 26 comprised on the arms 62, 64. Accordingly, the lug portion 56a can alternately be referred to as a pinched structure. Of course, as will be appreciated by those skilled in the art, the lug portion 56a need not be limited to being formed as a single-pronged structure and could alternately be formed as a pronged structure (e.g., a two prong structure). Likewise, the pinching structure (i.e., the lower torque link 24), and particularly the two-pronged end 26 thereof, need not be limited to being formed as a two-pronged structure and could alternately be formed as a single pronged or three or more pronged structure.

Figure 7:
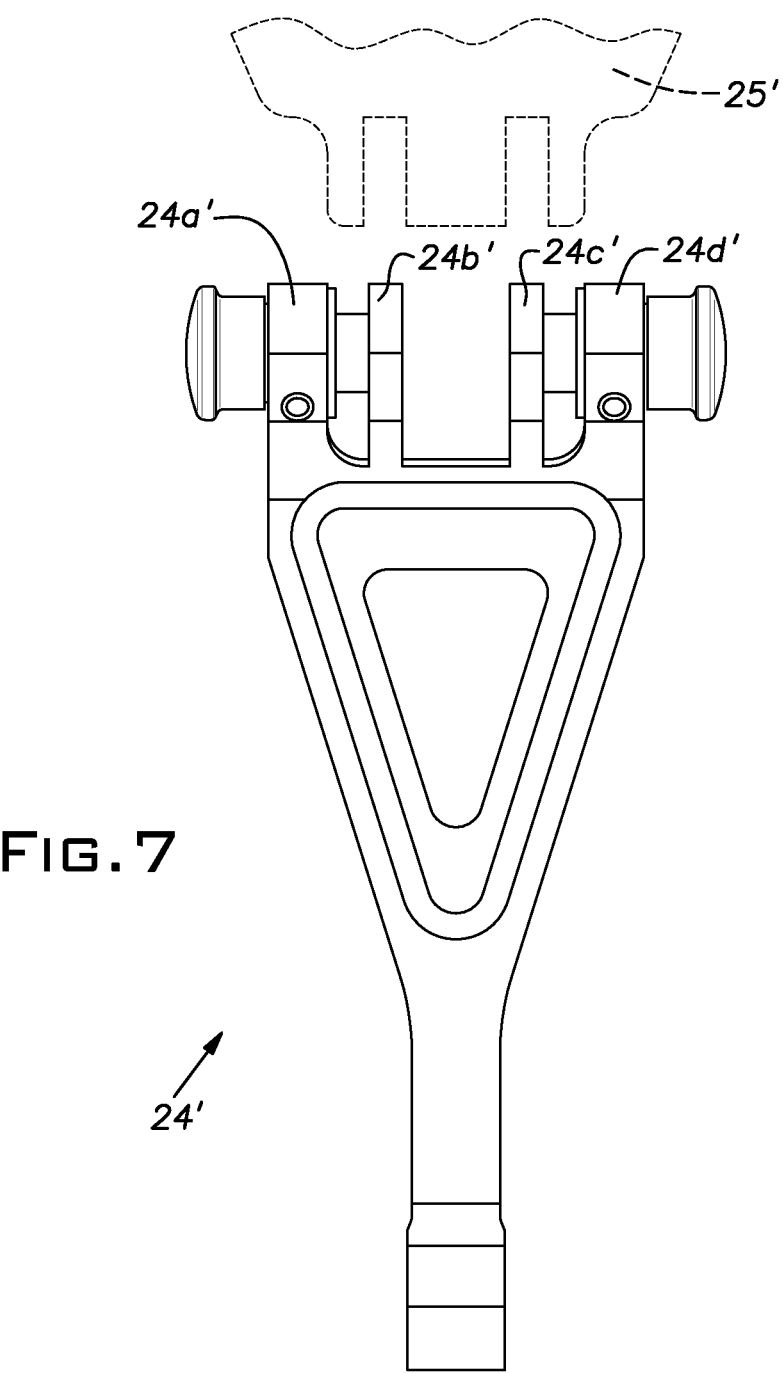
FIG. 7 is a plan view similar to FIG. 5 of a four-pronged torque link member according to an alternate embodiment.
Figure 8:
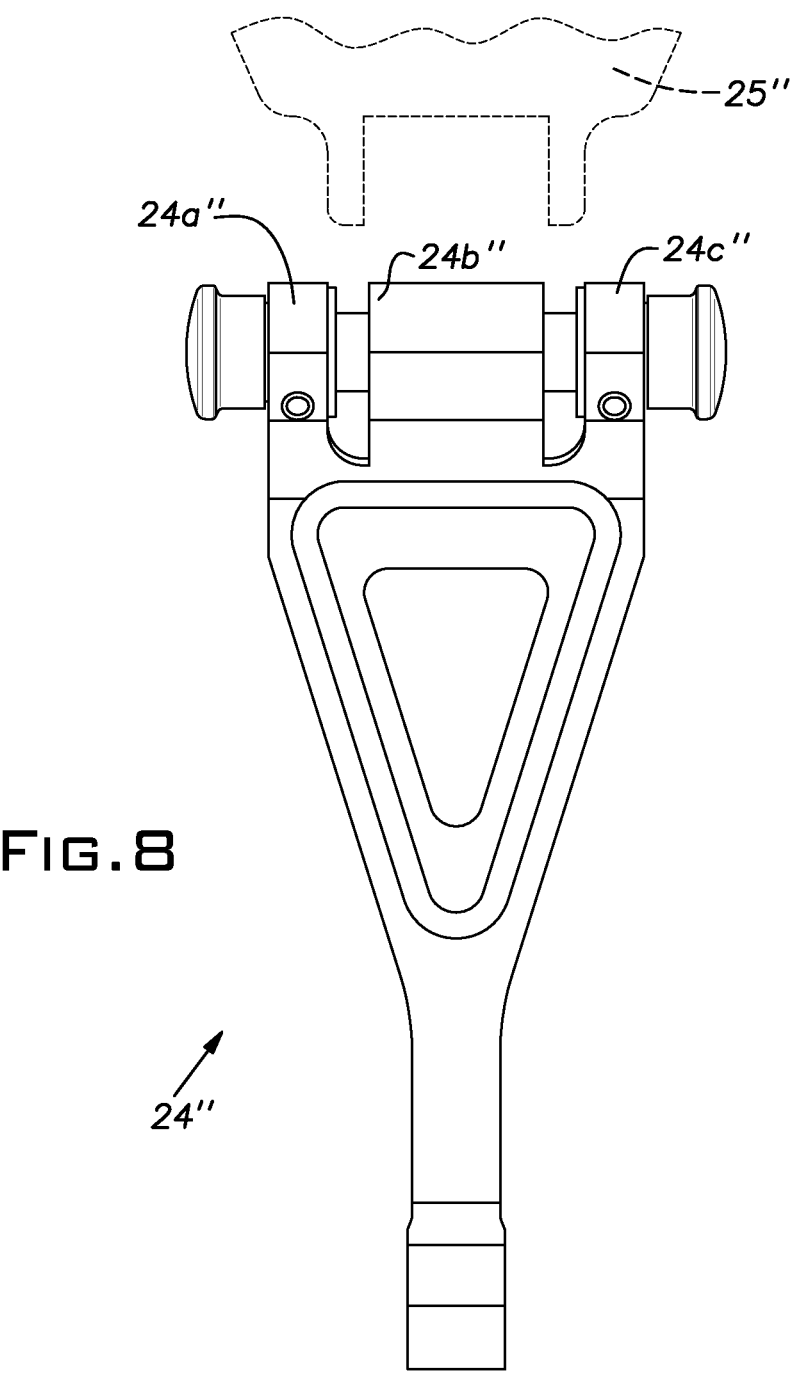
FIG. 8 is a plan view similar to FIG. 5 of a three-pronged torque link member according to another alternate embodiment.
Figure 9:
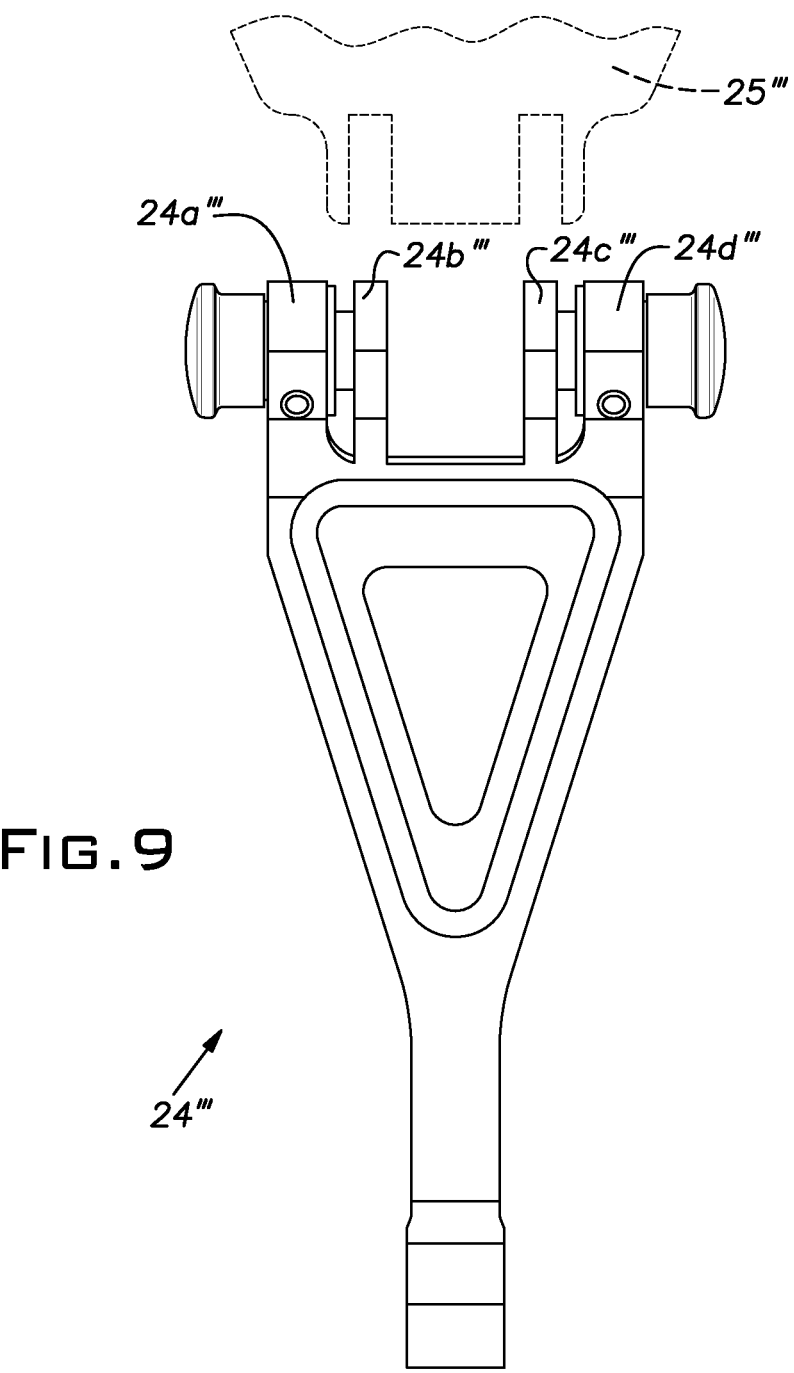
FIG. 9 is a plan view similar to FIG. 5 of a four-pronged torque link member according to still another alternate embodiment.

Examples of torque link members having alternate pronged structures (e.g., pinching structures with at least three prongs) are illustrated in FIGS. 7-9. In particular, torque link or pinching structure 24' illustrated in FIG. 7 includes four prongs 24a', 24b', 24c' and 24d' suitable for cooperatively engaging a two or three pronged cooperating structure or pinched structure 25'. Torque link or pinching structure 24" illustrated in FIG. 8 includes three prongs 24a", 24b" and 24c" suitable for cooperatively engaging a two pronged cooperating or pinched structure 25". Similar to FIG. 7, torque link or pinching structure 24''' illustrated in FIG. 9 includes four prongs 24a''', 24b''', 24c''' and 24d''' suitable for cooperatively engaging a two or three pronged cooperating or pinched structure 25'''. Of course, other variations than those illustrated are possible and are to be considered within the scope of the present disclosure.

Also in the illustrated embodiment, the locking pins 32, 34 are each continually urged toward their respective engaged positions (i.e., the positions shown in FIGS. 3 and 4) by coil springs 66. The locking pins 32, 34 are urged toward their engaged positions by the springs 66 even when the torque link member 24 is disconnected from the lower portion 16 (i.e., even when the lower torque link members 24 is disconnected from the lug 56a). The pins 32, 34 are axially movable between their engaged positions, wherein the pins 32, 34 protrude for interengagement with the cooperating structures 36, 38 on the lug 56a of the lower portion 16, and disengaged positions, wherein the lower torque link member 24 can be disconnected from the lower portion 16 (or reconnected together). The coil springs 66 bias the locking pins 32, 34 toward the engaged positions, but the pins 32, 34 are movable against the biasing of the coil springs 66, such as by a manually applied pulling force, to the disengaged positions. The springs 66 can each have a sufficient spring force for returning the respective pins 32, 34 to the engaged position whenever an insufficient external force (or no force) is applied to the pins 32, 34.

As shown, each of the locking pins 32, 34 of the illustrated embodiment has an insertion end 70 receivable in a corresponding cooperating structure 36, 38 when the pins 32, 34 are in their engaged positions. The cooperating structures 36, 38 are defined by and/or in the lug 56a. More particularly, in the illustrated embodiment, the lug 56a includes a throughole 72. At each end of the throughole 72, sleeve-type bushings 74 are received partially in the throughole 72 for providing an engagement surface for the pins 32, 34. The bushings 74 of the illustrated embodiment include a shaft portion 74a received in the throughole 72 and a head portion 74b for seating the bushing 72 against the lug 56a. The shaft portion 74a defines a bore 75 in which the corresponding pin 32 or 34 is slidably received when the pins 32, 34 are engaged. Of course, it is to be appreciated by those skilled in the art that the cooperating structures 36, 38 can have alternate configurations (e.g., throughole 72 can be replaced with two separate holes or recesses, the receiving apertures for the pins 32, 34 can be formed by a sleeve-like wall extending outward from the lug 56a, etc.).

Opposite the insertion end 70, the locking pins 32, 34 can each include a handle or handle portion 78 to facilitate manual pulling of the locking pins 32, 34 from the engaged positions to the disengaged positions against the urging of the springs 66. The elastic force of the springs 66 can be adjusted or set so that the locking pin 32, 34 connect the connecting portion C firmly and the handle portions 78 can be pulled by a human power when the connecting portion C is disengaged. The handle portions 78 allow for relatively easy manipulation of the pins 32, 34.

The illustrated locking pins 32, 34 are configured such that first or inner ends 66a of the springs 66 act against radial flanges 80 of the locking pins 32, 34. The flanges 80 move with their respective locking pins 32, 34. Second or outer ends 66b of the springs 66 act against respective head portions 82 of the torque link member 24, which do not move with the locking pins 32, 34. More specifically, a slider tube 84 can depend annularly from the radial flange 80 to define an annular space 86 radially about each pin 32, 34. Since the slider tube 84 is attached or mounted to its respective pin 32, 34 and moves therewith, the slider tube 84 can be referred to as a moving annular wall or moving slider tube. The head portions 82 form seats against which the handle portions 78 of the pins 32, 34 can rest when in engaged positions.

A cap 88 or bushing 88, which includes the head portion 82 in the illustrated embodiment, has a wall portion 90 that depends annularly from the head portion 82 to further define the annular space 86. The wall portion 90 is received through an aperture 91 defined in each of the arms 62, 64. The bore size of the apertures 91 defined in the arms 62, 64 can be the same or substantially the same as the bore size of the throughole 72 defined in the lug 56a of the wheel frame 56. An inner surface of the wall portion 90 defines a bore 93 in which the slider tube 84 is slidably received. A bore size of the stationary cap 88 (i.e., the bore size of the bore 93) and a bore size of the bushing 74 (i.e., the bore size of the bore 75) can be substantially the same size, whereas a section area or outer diameter of the slider tube 84 can be almost same or slightly smaller than the bore size of the stationary cap 88 and the bushing 74 to facilitate relative sliding of the slider tube 84.

The cap 88 further includes a bushing face 92 disposed adjacent an opposite axial end from the head portion 82. The bushing face 92 seats against the lower torque link 24 (i.e., to one of the arms 62, 64) to fixedly connect the stationary cap 88 of each pin 32, 34 to its corresponding arm 62, 64. The cap 88, which is mounted or attached to its corresponding arm 62, 64, can be referred to as a stationary annular wall or a stationary cap. The bushing face 92 can be welded or otherwise secured to the arm 62 or 64 for securing the stationary cap 88 to the arm 62 or 64. Of course, as will be appreciated by those skilled in the art, the cap 88 can have other configurations and/or can be secured to the arm 62, 64 in other manners. In the illustrated embodiment, the bushing face 92 engages and thereby forms a contact face for the corresponding bushing 74 on the lug 56a.

The cap 88 can have two functions. One can be a housing and guide function for the slider tube 84. In particular, the cap 88 provides a housing for the slider tube 84 and also provides a guiding surface for guiding sliding movement of the slider tube 84 inside the stationary cap 88. The slider tube 84 is telescopingly received within the stationary cap 88 to define the annular space 86 as a closed annularly space and telescopingly moves relative thereto when the respective pin 32, 34 is moved between its engaged and disengaged positions. In particular, the spring 66 is received in the annular space 86 around the pin 32 or 34 and thus is fully encompassed or enclosed by a housing formed by the pin 32 or 34, the slider tube 84 and the stationary cap 88. Another function is a seat function for the spring 66, which allows the spring 66 to bias or urge the slider tube 84 toward the engaged position. In particular, the head portion 82 of the cap 88 provides a wall surface from which the spring 66 can exert a spring force onto the slider tube 84.

Figure 3:
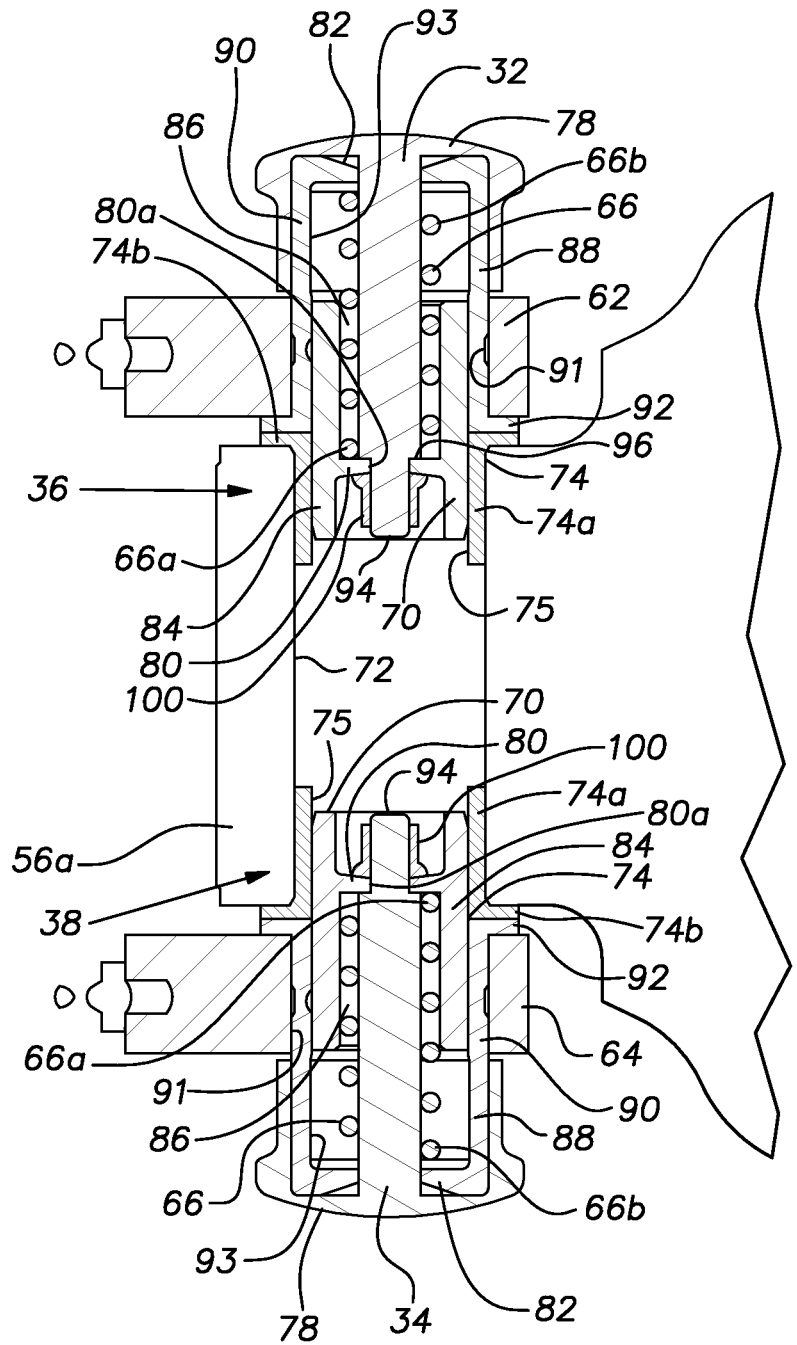
FIG. 3 is a sectional view of the lower connecting portion taken along the line 3-3 of FIG. 2.
Figure 4:
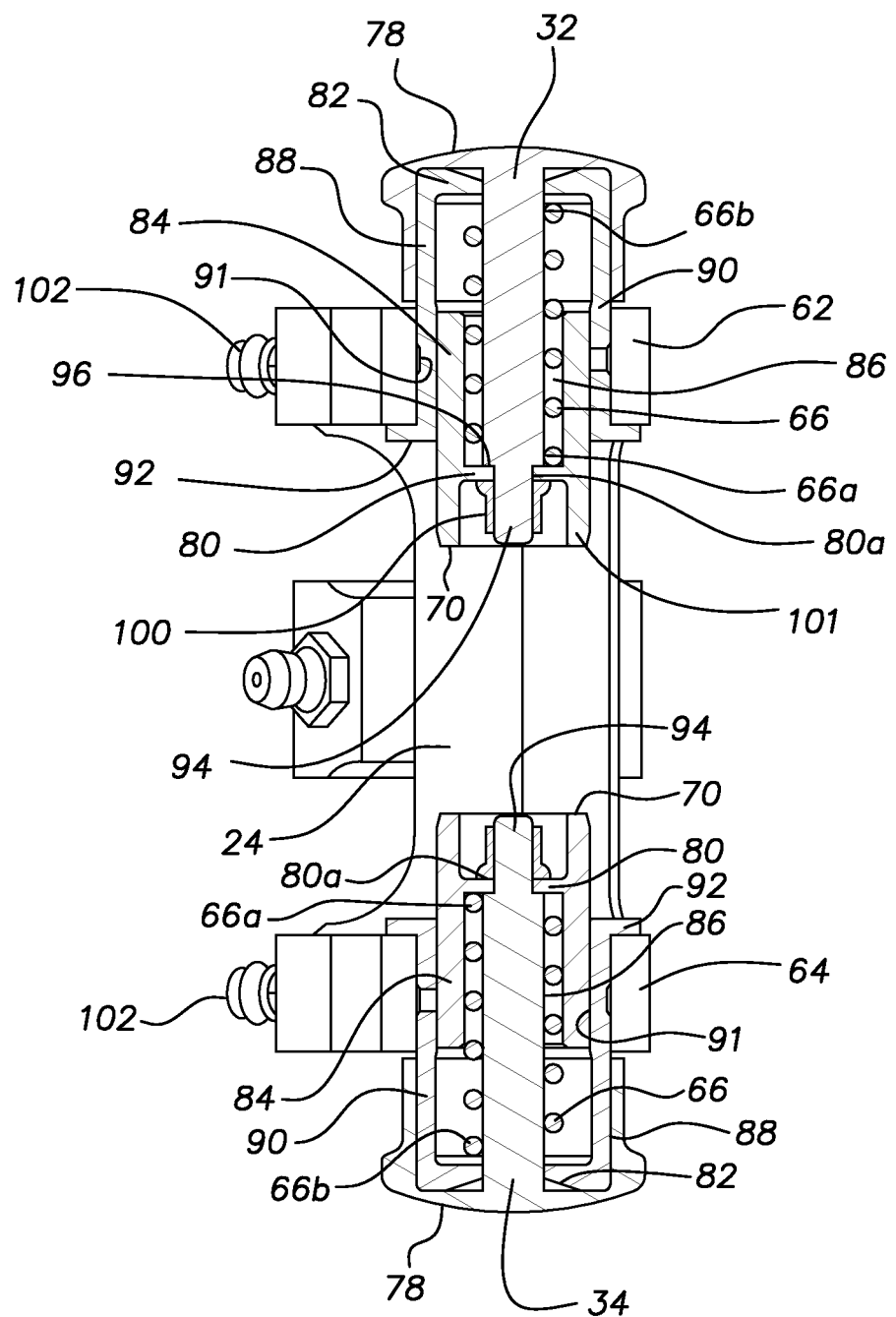
FIG. 4 is another sectional view similar to FIG. 3, but showing the first end of lower torque link member in a disengaged condition (i.e., disconnected from the lower portion).

With reference to FIG. 3, the slider tube 84 having the radial flange 80 and the aperture 80a fits over a pin tip 94 and is seated against a shoulder 96 of the respective pin 32, 34. A nut 100 is threaded onto the tip 94 to fixedly secure the slider tube 84 and the pin 32 or 34 together. As shown, the slider tube 84 can include insertion end 70 that annularly surrounds the nut 100 and the tip 94. The bore sizes of the throughole 72 and the apertures 91, which can be substantially the same, can be slightly larger than the sectional area of the insertion end 70 and the slider tube 84.

The slider tube 84 can function as a bushing for the cooperating structures 36 or 38, as described in more detail below, and can additionally provide a bearing surface on which a grease or other lubricant can be provided for facilitating sliding movement between the bushing 74 and stationary cap 88, and more generally between the pins 32, 34 and their respective arms 62, 64. As shown, grease fittings 102 in FIG. 4 can be provided on the arms 62, 64 with a corresponding passage (not shown) for introducing or forcing grease to the outer surface of the slider tube 84 (i.e., the surface that bears against or moves relative to the stationary cap 88).

The locking pins 32, 34 in their engaged positions and in cooperation or interengagement with the cooperating structures 36, 38 connect the lower torque link member 24 and the lower portion 16 together and forms a rotatable joint at the lower connecting C allowing relative rotation between the lower torque link member 24 and the lower portion 16. In particular, an axis of each of the pins 32, 34 forms a rotatable axis between the first end 26 of the lower torque link 24 and the lower portion 16, particularly the lug 56a thereof. Likewise, if the locking pins were disposed between the upper portion 14 and the first end 20 of the upper torque link 18 or between the second ends 22, 28 of the torque links, the pins 32, 34 would form rotatable connections about their axes between these components (i.e., at connecting portions A and B). In the embodiment of FIGS. 2-5, both pins 32, 34, which are arranged such that their respective axes are in collinear relation with one another, form a rotatable connection between the lower torque link 24 and the lower portion 16.

Unlike prior art quick release mechanisms, the spring 66 biases the locking pins 32, 34 toward the engaged positions.

That is, except for moving from the engaged position to the disengaged position, the locking pins 32, 34 are not otherwise removable from the torque link member 24. This presents a compact assembly because the engage/disengage structures are placed in the housing of the arms 62, 64 efficiently. Additionally, this invention does not allow for the locking pins 32, 34 to become lost by means of stopper structures by the slider tube 84 and the head portion of the cap 88 in addition to the spring force of the spring 66 or otherwise inconvenient to the user. These are advantageous in that the device is self-contained and remains self-contained even when the pins 32, 34 are in their respective disengaged positions. Also there is no loose hardware (e.g., a dangling lanyard) to become lost or damaged, or to cause damage to other structures of the landing gear. An additional advantage is that the same number or fewer parts are required as compared to prior art connection devices, which ultimately results in a reduction of weight and cost. Additionally, operation of the quick release assembly 30 only requires pulling the pins 32, 34 when disconnecting the connecting portion C. The engage and disengage operation of this invention is very easy for the user. In contrast, some conventional locking pins require the user to push a button of a locking pin, and then pull the pin from the connecting portion.

Figure 6:
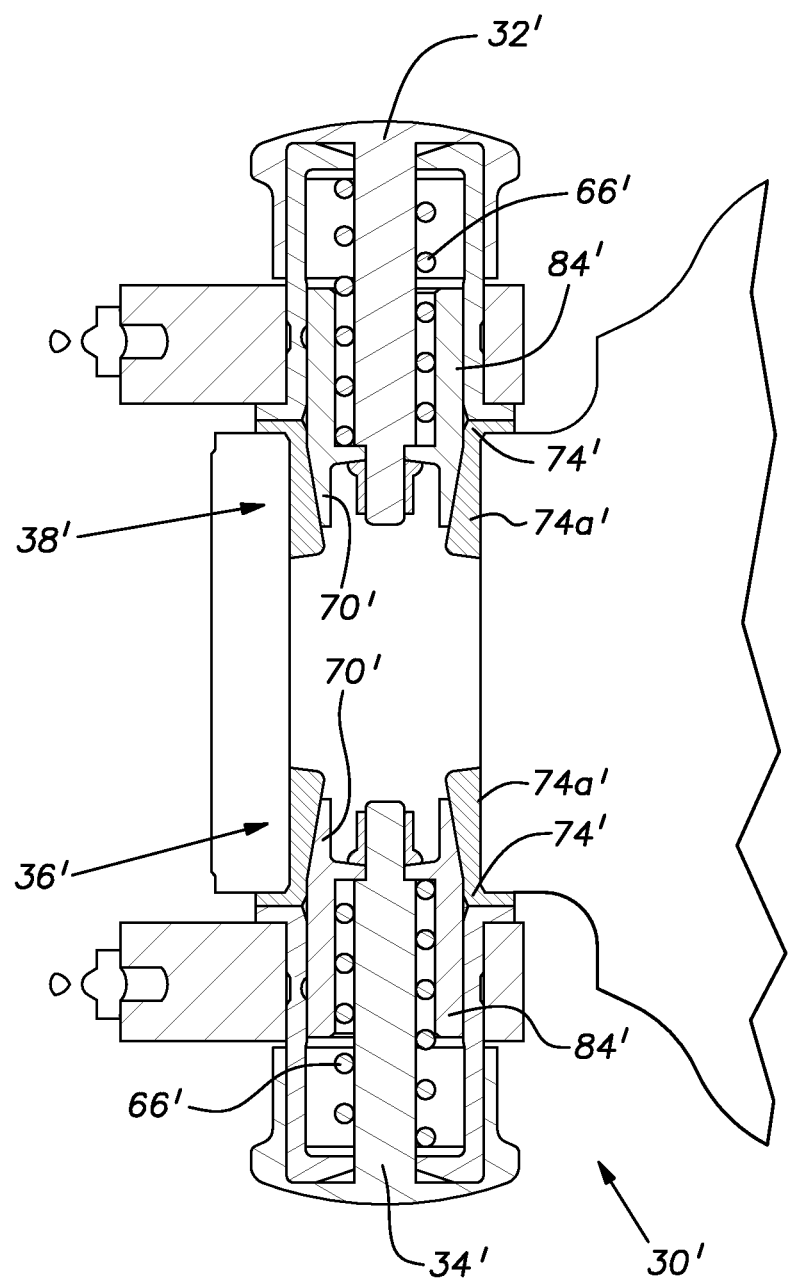
FIG. 6 is a sectional view similar to FIG. 3 showing a quick release assembly according to an alternate embodiment.

With reference to FIG. 6, a quick release assembly 30' is illustrated according to an alternate embodiment. Except as indicated below, the quick release assembly 30' can be same as the quick release assembly 30 discussed hereinabove. Accordingly, like reference numbers are used to identify like parts and like reference numbers with a prime symbol are used to identify similar corresponding parts. A main difference between the quick release assembly 30' and the quick release assembly 30 is the use of a tapered interface between the pins 32', 34' and the cooperating structures 36', 38' in the quick release assembly 30'. In the quick release assembly 30, the insertion end 101 of the slider tube 84 has a generally constant cylindrical outer profile that cooperates with a generally matching constant cylindrical inner profile of the bushing wall portions 74*a*. In contrast, the quick release assembly 30' has insertion end 70' of the slider tubes 84' with a tapered outer profile that cooperates with a tapered inner profile of the bushing wall portions 74*a'*. As a result, the springs 66' bias the slider tubes 84' toward the corresponding bushings 74' to lock the connecting portion. Due to the mating tapers, a clearance gap between the slider tubes 84' and the corresponding bushings 74' is reduced by the force of the springs 66' and the connecting portion is more firmly fixed with no space. The angle of the taper (or the use of no taper) can be adjusted to control freedom of movement between the jointed components (i.e., between the pins 32', 34' and the cooperating structures 36', 38'). This invention makes the arms 62, 64 and the lug 56*a* easy to align when connecting the link 24 and the lug 56*a*.

While the quick release assemblies disclosed herein have been described in reference to aircraft landing gear, it is to be appreciated that thee could be used as a general connecting structure in other applications and environments. Moreover, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A quick release assembly, comprising:
a pinching structure having at least two pronged portions;
a pinched structure having at least one bushing defining a bushing bore; and
a locking pin disposed on each of the at least two pronged portions, the locking pin including a handle portion, a stationary cap fixed to the pronged portion and having a stationary cap bore, a slider tube that slides inside the stationary cap and together with the handle portion between an engaged position and a disengaged position, and a spring biasing the slider tube toward the engaged position;
and wherein bore sizes of the stationary cap bore of the stationary cap fixed to the pinching structure and the bushing bore of the at least one bushing of the pinched structure are substantially the same size, and a section area of a connecting side of the slider tube is slightly smaller than the bore size of the stationary cap of the pinching structure and the bushing bore of the pinched structure.

2. The quick release assembly of claim 1, wherein the slider tube and the bushing of the pinched structure are tapered to cooperatively engage one another when each locking pin is in the engaged position.

3. The quick release assembly of claim 1, wherein the pinching structure has at least a three-pronged portion, and the pinched structure has at least a two-pronged portion, and locking pins are disposed on both sides of the pinching structure.

4. The quick release assembly of claim 3, wherein the pinching structure has a four-pronged portion, and the pinched structure has a three-pronged portion.

5. The quick release assembly of claim 1, wherein the pinching structure is disposed at the first end and/or second end of the lower torque link of an aircraft landing gear strut, the pinched structure is disposed at the lug of the wheel frame and/or the second end of the upper torque link of the aircraft landing gear strut.

6. The quick release assembly of claim 1, wherein the pinching structure is disposed at the first end and/or second end of the upper torque link of an aircraft landing gear strut, the pinched structure is disposed at the lug of the collar and/or the second end of the lower torque link of the aircraft landing gear strut.

7. A quick release assembly for an aircraft landing gear strut, the strut having an upper portion and a lower portion that is telescopingly and rotatably movable relative to the upper portion, an upper torque link member has a first end connected to the upper portion, a lower torque link member has a first end connected to the lower portion, second ends of the torque link members are connected together to prevent relative rotation between the upper and lower portions, comprising:
a locking pin disposed on a first member wherein the first member is one of the upper portion, the upper torque link member, the lower torque link member or the lower portion; and
a cooperating structure disposed on a second member wherein the second member is another of the upper portion, the upper torque link member, the lower torque link member or the lower portion;
and wherein the locking pin is axially urged toward an engaged position wherein the locking pin cooperates with the cooperating structure of the second member when the locking pin and the cooperating structure are aligned to connect the first and second members together, the locking pin axially movable against the urging from the engaged position to a disengaged position to disconnect the first and second members;

and further wherein the locking in includes a handle portion, a stationary cap fixed to the first member, a slider tube that slides inside the stationary cap and together with the handle portion between the engaged position and the disengaged position, and a spring that axially urges the locking pin toward the engaged position, the spring interposed between a head portion of the handle portion and a radial flange of the slider tube, and received radially within an annular space defined by an annular wall portion of the slider tube.

8. The quick release assembly of claim 7, wherein a bore size of the stationary cap of the first member and a bushing bore of the cooperating structure are substantially the same size, and a section area of a connecting side of the slider tube is slightly smaller than the bore size of the stationary cap of the first member and the bushing of the cooperating structure.

9. The quick release assembly of claim 7, wherein the slider tube and the bushing of the cooperating structure are tapered to cooperatively engage one another when the locking pin is in the engaged position.

10. The quick release assembly of claim 7 wherein the first member has at least a three-pronged portion, and the second member has at least a two-pronged portion, and the locking pin is one of two locking pins disposed on both sides of the first member.

11. The quick release assembly of claim 10, wherein the first member has a four-pronged portion, and the second member has a three-pronged portion.

12. The quick release assembly of claim 7, wherein the first member is the lower torque link member and second member is either the upper torque link member or the lower portion.

13. The quick release assembly of claim 7 further including:
a second locking pin disposed on the first member;
a second cooperating structure disposed on the second member;
the second locking pin axially urged toward an extended position wherein the second locking pin cooperates with the second cooperating structure of the second member when the second locking pin and the second cooperating structure are aligned to connect the first and second members together, the second locking pin axially movable against the urging from the extended position to a retracted position, both the first and second locking members in the retracted positions allow disconnection of the first and second members.

14. The quick release assembly of claim 7, wherein the first member is the upper torque link member and the second member is either the lower torque link member or the upper portion.

15. An aircraft landing gear assembly, comprising:
an upper portion;
a lower portion telescopingly and rotatably movable relative to the upper portion;
an upper link having a first end connected to the upper portion and a second end;
a lower torque link having a first end connected to the lower portion and a second end, the second ends of the upper and lower torque links connected together to prevent relative rotation between the upper and lower portions; and a quick release assembly connecting one of the first end of the upper torque link and the upper portion, the first end of the lower torque link and the lower portion, or the second end of the upper torque link and the second end of the lower torque link, the quick release assembly including:

a pin disposed on one of the first end of the upper torque link, the upper portion, the first end of the lower torque link, the lower portion, the second end of the upper torque link or the second end of the lower torque link, the pin slidably movable between an engaged position and a disengaged position with the pin urged toward the engaged position wherein the pin cooperates with a cooperating structure disposed on another of the first end of the upper torque link, the upper portion, the first end of the lower torque link, the lower portion, the second end of the upper torque link or the second end of the lower torque link when the pin is aligned with the cooperating structure, and the pin manually movable against the urging to the disengaged position for disconnecting said one of the first end of the upper torque link, the upper portion, the first end of the lower torque link, the lower portion, the second end of the upper torque link or the second end of the lower torque link from said another of the first end of the upper torque link, the upper portion, the first end of the lower torque link, the lower portion, the second end of the upper torque link or the second end of the lower torque link;

wherein the locking pin includes a handle portion, a stationary cap, a slider tube that slides inside the stationary cap and together with the handle portion between the engaged position and the disengaged position, and a spring that axially urges the locking in toward the engaged position the spring received radially within the slider tube and fully enclosed within the handle portion and the slider tube.

16. The aircraft landing gear of claim 15 wherein an axis of the pin forms a rotatable axis between said one of the first end of the upper torque link, the upper portion, the first end of the lower torque link, the lower portion, the second end of the upper torque link or the second end of the lower torque link and said another of the first end of the upper torque link, the upper portion, the first end of the lower torque link, the lower portion, the second end of the upper torque link or the second end of the lower torque link.

17. The aircraft landing gear of claim 15, wherein a bore size of the stationary cap and a bushing of the cooperating structure are substantially the same size, and a section area of a connecting side of the slider tube is slightly smaller than the bore size of the stationary cap and the bushing of the cooperating structure.

18. The aircraft landing gear of claim 16, wherein the slider tube and the bushing of the cooperating structure are tapered to cooperatively engage one another when the locking pin is in the engaged position.

* * * * *